United States Patent [19]
Swart

[11] Patent Number: 5,522,617
[45] Date of Patent: Jun. 4, 1996

[54] TRIGGERING CIRCUIT FOR A CRASH SENSOR-CONTROLLED PROTECTIVE SYSTEM IN A VEHICLE

[75] Inventor: Marten Swart, Obertraubling, Germany

[73] Assignee: Siemens Aktiengesellschaft, Munich, Germany

[21] Appl. No.: 304,531

[22] Filed: Sep. 12, 1994

[63] Continuation of PCT/EP93/00534, Mar. 9, 1993.

[30]     Foreign Application Priority Data

Mar. 12, 1992 [EP] European Pat. Off. ........... 92104315.4

[51] Int. Cl.⁶ .................................................. B60R 21/32
[52] U.S. Cl. .......................... 280/735; 180/282; 307/10.1
[58] Field of Search .................... 280/735, 734, 280/728 R, 728.1; 180/282, 274; 307/10.1; 340/436, 438, 669

[56]         References Cited

U.S. PATENT DOCUMENTS

| | | | |
|---|---|---|---|
| 4,222,030 | 9/1980 | Yasui et al. | 280/735 |
| 4,384,734 | 5/1983 | Yasui | 280/735 |
| 4,851,705 | 7/1989 | Musser et al. | 280/735 |
| 5,068,640 | 11/1991 | Burger et al. | 280/735 |
| 5,204,547 | 4/1993 | Schumacher et al. | 280/735 |
| 5,320,382 | 6/1994 | Goldstein et al. | 280/735 |

FOREIGN PATENT DOCUMENTS

| | | |
|---|---|---|
| 0343578 | 11/1989 | European Pat. Off. . |
| 0453255 | 10/1991 | European Pat. Off. . |
| 8904779 | 6/1989 | WIPO . |
| 9100636 | 1/1991 | WIPO . |
| 9105680 | 5/1991 | WIPO .................... 280/735 |

*Primary Examiner*—Margaret A. Focarino
*Assistant Examiner*—Peter C. English
*Attorney, Agent, or Firm*—Herbert L. Lerner; Laurence A. Greenberg

[57]         ABSTRACT

A triggering circuit for a crash sensor-controlled protective system for the occupant of a vehicle includes a firing capacitor being charged to a capacitor voltage by the electrical system of the vehicle before an accident, as an energy source for firing a gas generator, that is for firing an explosive charge or for firing a firing cap of an explosive charge. At least one crash sensor detects the occurrence of the sensor values that trigger the firing and controls the firing of the gas generator by one or more contacts by discharging the firing capacitor. A plurality of firing capacitors which are provided in a switching-over manner are connected in parallel before an accident and then charged to a capacitor voltage corresponding to the voltage of the electrical system of the vehicle and in the case of an accident are connected in series in a low-impedance manner by at least one single contact in such a way that, at least at the start of firing, the instantaneous total voltage through the series connection is greater than the individual capacitor voltages in themselves. The total voltage can be fed to the gas generator in a low-impedance manner by at least one single contact.

15 Claims, 2 Drawing Sheets

TRIGGERING CIRCUIT FOR A CRASH SENSOR-CONTROLLED PROTECTIVE SYSTEM IN A VEHICLE

CROSS-REFERENCE TO RELATED APPLICATION

This application is a Continuation of International Application Ser. No. PCT/EP93/00534, filed Mar. 9, 1993.

BACKGROUND OF THE INVENTION

FIELD OF THE INVENTION

The invention relates to a triggering circuit for a crash sensor-controlled protective system for the occupant of a vehicle, for example an air bag or seat belt retractor configuration, including:
 a firing capacitor which is charged before the accident to a capacitor voltage from the electrical system of the vehicle as an energy source for firing a gas generator, that is for firing an explosive charge or for firing a firing cap of an explosive charge; and
 at least one crash sensor which detects the occurrence of sensor values that trigger the firing and which controls the firing of the gas generator by discharging the firing capacitor, by means of one or more contacts.

A triggering circuit of that kind is familiar per se to a person skilled in the art of such protective systems, for example from Published International Application WO 91/05680.

The person skilled in the art is also familiar with the fact that a main problem with such systems is the reliability of firing in the case of an accident. The firing capacitor is intended to store the required amount of energy to be able to reliably fire the gas generator even if the electrical system of the vehicle were to be destroyed in the case of an accident.

However, the invention is based on the fact that it must be certain that the firing capacitor has been sufficiently charged before the accident even if the firing capacitor stores an insufficient amount of firing energy, and in particular with an insufficiently high capacitor voltage, because of an undervoltage in the electrical system of the vehicle lasting for a relatively long period of time, for example because only +8 V instead of +12 V have been present for a long time. The gas generators in fact require adequately high firing energy over an adequately short time period. For that purpose, an adequately high firing voltage, as is seen in the 30 V source in FIGS. 1 to 6 of Published International Application WO 91/05680, is also required at the start of firing.

The amplification of the stored firing energy by increasing the capacitance of the capacitor is often not sufficient because the firing voltage of the firing capacitor may not drop below a minimum value either.

It is possible to remedy that problem by means of a voltage transformer in the electrical system of the vehicle, or in the triggering circuit, with the voltage transformer producing as required, for example +20 V or +30 V from the electrical voltage of the vehicle which is, for example, +8 V to 15 V, in order to charge the firing capacitor with the direct voltage being increased in that way. However, that solution requires a considerable outlay for circuitry, and such transformers are often not operationally reliable for an adequately long time either, as measured in comparison with the long service life of the vehicle.

SUMMARY OF THE INVENTION

It is accordingly an object of the invention to provide a triggering circuit for a crash sensor-controlled protective system in a vehicle, which overcomes the hereinaforementioned disadvantages of the heretofore-known devices of this general type and which adopts a different strategy in order to ensure an adequately high firing energy with an adequately high firing voltage and a long service life even if the vehicle's electrical voltage has extremely low values, for whatever reasons.

With the foregoing and other objects in view there is provided, in accordance with the invention, in a vehicle including an electrical system and a vehicle occupant protective system, such as an air bag or a seat belt retractor configuration, having at least one gas generator, a triggering circuit for the protective system, comprising a plurality of firing capacitors being charged before an accident to a capacitor voltage from the electrical system, as an energy source for firing the at least one gas generator, that is for firing an explosive charge or a firing cap of an explosive charge; and at least one crash sensor controlling the protective system by detecting an occurrence of sensor values triggering the firing and having at least one single contact controlling the firing of the at least one gas generator by discharging the firing capacitor; the plurality of firing capacitors being connected in parallel before the accident and then charged to a capacitor voltage corresponding to the voltage of the electrical system, and being switched-over to be connected in series with low-impedance upon the occurrence of the accident, by the at least one single contact, for setting an instantaneous total voltage through the series connection to be greater than individual capacitor voltages in themselves, at least at the start of firing; and the at least a single contact feeding the total voltage to the at least one gas generator with low-impedance.

According to the invention, a parallel connection of at least two firing capacitors is charged with the voltage of the electrical system of the vehicle. The firing capacitors which were previously connected in parallel are connected in series in the event of a crash, as a result of which the total voltage through the series connection is a corresponding multiple of the voltage of the electrical system of the vehicle. Even if only two firing capacitors are provided, the total voltage is already twice the voltage of the electrical system of the vehicle. It is also possible initially to charge more than two firing capacitors connected in parallel with the voltage of the electrical system of the vehicle and to connect all of these firing capacitors to one another in series, as a result of which the correspondingly high total voltage is achieved when required. Therefore, literally any desired total voltage can be obtained by means of the system of firing voltage amplification according to the invention.

The invention was initially conceived as an improvement of the triggering circuit described in Published International Application WO 91/05680. However, it quickly became apparent that the invention can also be applied generally to all triggering circuits defined at the outset above.

In accordance with another feature of the invention, the firing capacitors are disconnected from the electrical system in a high-impedance manner at the start of firing, directly after the actuation of the at least one contact, for setting the total voltage to be greater than the voltage in the electrical system and for causing currents of the firing capacitors to flow essentially through the at least one gas generator instead of through the electrical system, as a result of the disconnection. In the case of an accident, these additional measures permit at least a considerable portion of the firing energy stored in the firing capacitors to be fed to the respective gas generator with a high degree of efficiency instead of, in the case of an accident:

charging the voltage source (battery) of the electrical system of the vehicle with the firing energy stored in the firing capacitors if the electrical system of the vehicle is per se still intact; or senselessly wasting firing energy if the electrical system of the vehicle already has a short circuit because of the accident.

In accordance with a further feature of the invention, there is provided at least one high-impedance resistor through which the charging of the respective firing capacitors takes place before the accident, the at least one high-impedance resistor forming the high-impedance disconnection of at least part of the firing capacitors from the electrical system.

In accordance with an added feature of the invention, there is provided at least one diode having low impedance for charging the firing capacitors and high impedance for the capacitor firing current occurring in the case of an accident as long as the respective instantaneous firing capacitor voltage is greater than the instantaneous voltage in the electrical system, the at least one diode forming the high-impedance disconnection.

These additional measures permit different, less costly variants for the high-impedance isolation to be provided.

In accordance with an additional feature of the invention, there is provided a parallel connection for the series connection of the firing capacitors being formed in the case of an accident, the parallel connection connecting a voltage source of the electrical system to the at least one gas generator in the case of an accident; and the parallel connection having a contact closing in the case of an accident, and a diode having a polarity conducting a firing current of the electrical system out of the voltage source of the electrical system through the at least one gas generator with a residual voltage occurring through the at least one gas generator, in the case of an accident, for at least as long as the electrical system is intact and for at least as long as a residual voltage to be fed to the at least one gas generator from the electrical system is greater than the instantaneous total voltage of the firing capacitors connected in series.

Such additional measures permit the firing energy to be fed with the particularly high firing voltage to the gas generator at the start of firing, and as the total voltage decreases, they also permit the rest of the firing energy to be obtained from the electrical system of the vehicle provided the electrical system of the vehicle is still adequately intact. If necessary, the rest of the firing energy required is also supplied from the firing capacitors that are still connected in series if, in fact, the electrical system of the vehicle is not capable of supplying energy.

In accordance with yet another feature of the invention, more of the firing capacitors than the gas generators are provided; and each of the firing capacitors is permanently assigned to a respective one of the gas generators, at least a further one of the firing capacitor capacitors is assigned to a plurality of the gas generators, and in the case of an accident the series connection of the firing capacitors supplying one of the gas generators with firing energy each containing one of the firing capacitors being permanently assigned to the respective gas generator and at least one further firing capacitor.

These additional measures permit the increased firing voltage to be made available, according to the invention, with a particularly small number of firing capacitors even at the start of firing if a plurality of gas generators are to be successively fired, that is to say, for example, if a plurality of air bags are to be successively inflated and/or if both air bags and seat belt retractors and possibly also gas-driven roll-over bars are to be successively activated.

In accordance with yet a further feature of the invention, there are provided firing switches each being assigned to a respective one of the permanently assigned firing capacitors; and an electronic evaluation system evaluating sensor values and controlling at least one of the firing switches individually for causing the firing of the gas generators to take place at different times.

Those additional measures permit the individual gas generators to be fired individually at different times.

In accordance with yet an added feature of the invention, at at least one crash sensor is a particularly sensitive safing sensor supplying analog or digital output signals, exclusively or additionally, permitting clear detection of decelerations or accelerations lying below a threshold above which the at least one gas generator is fired.

In accordance with yet an additional feature of the invention, there is provided an electronic evaluation device formed by a microprocessor for converting analog output signals from the at least one crash sensor into at least one ON/OFF signal controlling at least one contact.

In a particularly simple manner, these additional measures permit shocks to vehicles to be distinguished, namely such shocks:

which correspond to a genuine crash situation and are therefore intended to trigger the firing of the gas generator, and those which only correspond to an unevenness of the roadway, that is to say, for example, a pot hole or a branch which has been traveled over, which are therefore not yet intended to trigger the firing of the gas generator.

In accordance with again another feature of the invention, there is provided at least one current source or voltage source being temporarily connected to at least one switching point; and including a measuring configuration; during a test currents flowing through the at least one gas generator being at least smaller than would be necessary to fire the at least one gas generator; and at least during a test measuring points of the triggering circuit being connected to the measuring configuration.

Such additional measures permit the reliability of the triggering circuit to be easily tested even years after installation in the vehicle.

In accordance with a concomitant feature of the invention, the firing capacitors are connected in series with high-impedance for test purposes.

Finally, such additional measures permit these tests to be carried out without risk, in fact without the gas generators being fired, despite the firing capacitors which are connected in series.

Other features which are considered as characteristic for the invention are set forth in the appended claims.

Although the invention is illustrated and described herein as embodied in a triggering circuit for a crash sensor-controlled protective system in a vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
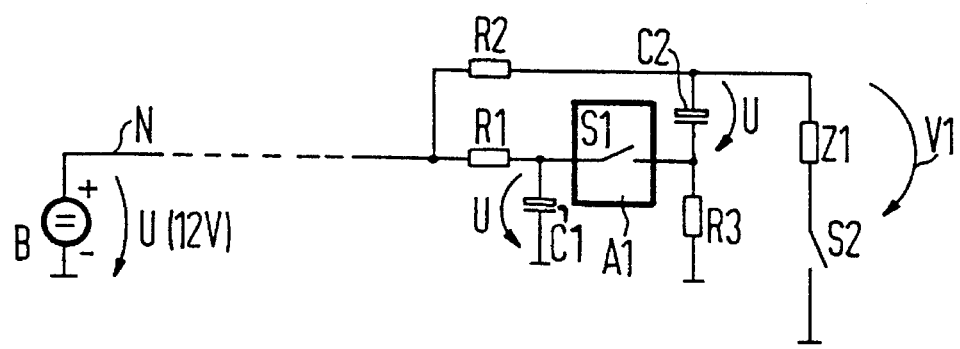
FIG. 1 is a schematic diagram of a triggering circuit which is constructed to be as simple as possible, in particular in order to explain the basic structure of the invention.
Figure 2:
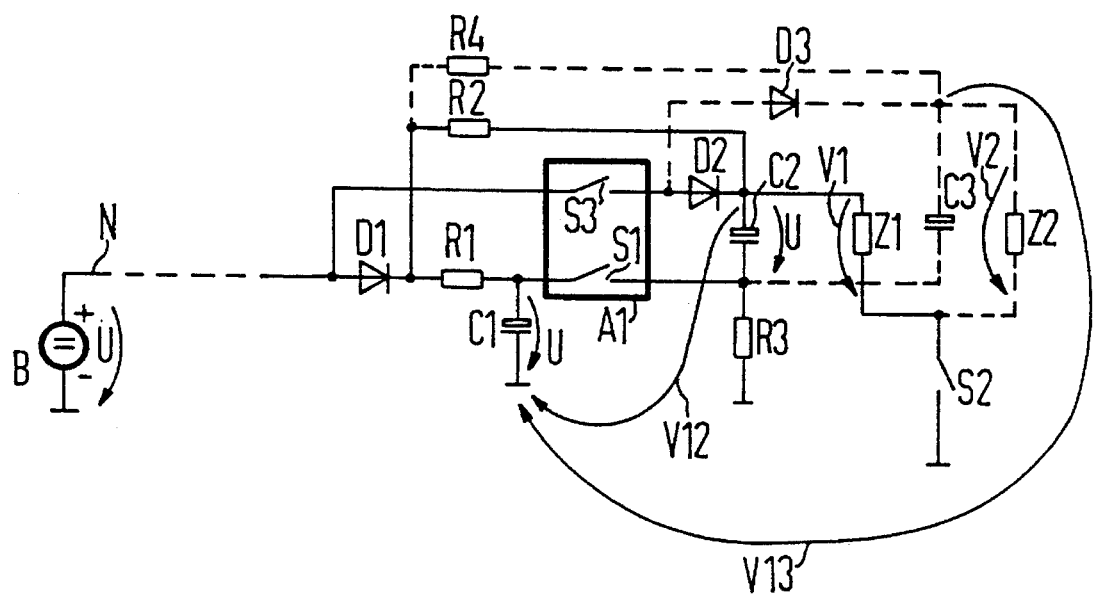
FIG. 2 is a schematic diagram of a triggering circuit which is more complicated than FIG. 1, for firing two different gas generators, in which case it is also possible, in particular, to use a corresponding dimensioning of their components to ensure that the connection series of the firing capacitors at the start of the firing, and after some time the rest of the firing, may also be performed by the electrical system of the vehicle if in fact the latter were still then adequately intact.
Figure 3:
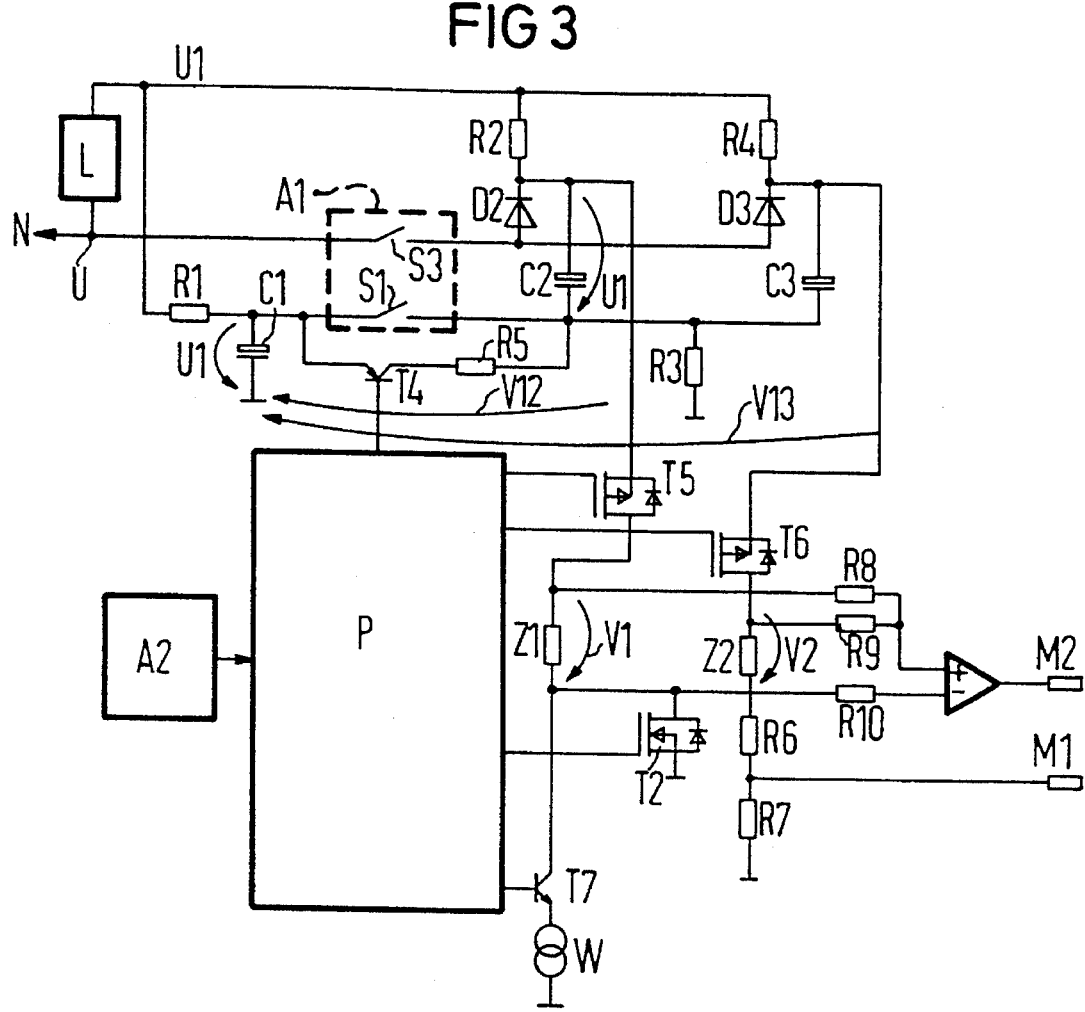
FIG. 3 is a schematic and block diagram of a triggering circuit which is even more complicated than FIG. 2, with which in fact it is possible, in particular, to fire the two gas generators at different times and in which a second crash sensor, an overvoltage protection device and a test configuration are additionally provided.

Referring now to the figures of the drawing in detail and first, particularly, to FIGS. 1 to 3 thereof, there are seen exemplary embodiments of the triggering circuit according to the invention. The triggering circuits are each controlled by a crash sensor A shown therein, which by way of example are:

a crash sensor A1 having one or two contacts S1/S3 in FIGS. 1 to 3, and a further crash sensor A2 with contacts T5 and T6 thereof controlled by a microprocessor P or an electronic evaluation system P in FIG. 3.

In each case, these crash sensors A are intended to detect whether decelerations or accelerations occur which are intended to trigger the protective systems of vehicles, that is to say, for example, an air bag configuration or seat belt retractor configuration.

These crash sensors A can be constructed in such a way that they supply analog output signals or sensor values which depend more or less continuously on the decelerations or accelerations. Herein, in each case an electronic evaluation system, as is seen in the microprocessor P in FIG. 3, may be additionally provided, which system determines from the respective sensor values the seriousness, possibly even the progression of the accident more or less precisely and controls the protective systems appropriately.

However, the crash sensors A can also be constructed in such a way that they supply digital sensor values, for example because they additionally contain an analog-digital converter and/or because they contain, for example, seismic bodies which above specific threshold values of the decelerations or accelerations close electrical contacts that output ON/OFF signals.

The triggering circuit shown in FIG. 3 is distinguished from the examples shown in FIGS. 1 and 2 by the additional contacts T5 and T6 which can be individually controlled by the crash sensor A2 by means of the evaluation circuit P that in this case can be a processor P. This is done in such a way that initially a first gas generator, for example Z1, can be fired, and only later a second gas generator, such as Z2, can be fired, with it being possible to fire both gas generators Z at the times which are ideal for them in each case.

All or only some of the contacts can therefore be electronically controlled contacts T, that is to say, for example, switching transistors, such as in particular T2, T5 and T6 in FIG. 3. However, they can also be mechanically triggered contacts S, such as S1 in FIGS. 1 to 3 and S3 in FIGS. 2 and 3.

These crash sensors A therefore each contain, or control, one or more contacts S and/or T which themselves control the discharging of firing capacitors C and thus the firing of the gas generators Z, such as:

firing capacitors C1 and C2 in FIGS. 1 to 3 and firing capacitors C3 in FIGS. 2 and 3, and in addition the gas generators Z1 in FIGS. 1 to 3 and the additional gas generators Z2 in FIGS. 2 and 3.

In this case, the firing capacitors C constitute energy sources C, that are charged through the electrical system N of the vehicle, for firing the gas generator Z. The gas generators Z are themselves each capable of constituting the explosive charges Z themselves or firing caps Z which serve to fire such explosive charges.

Therefore, as soon as sensor values occur:

at the crash sensors A1 according to FIGS. 1 to 3, and additionally at the crash sensor A2 according to FIG. 3, which correspond to certain decelerations or accelerations of the vehicle occurring in the event of a serious accident, these triggering circuits protect one or more occupants of the vehicle against injuries by the gas generators Z then being fired:

by means of their contacts, such as S1 S2 S3 T2 T5 T6 and by means of the firing capacitors, such as C1 C2 C3, which gas generators Z in each case activate the protective systems that protect the vehicle occupants, by means of their gases.

A particular feature of the triggering circuits according to the invention is the fact that the firing capacitors Z:

are charged while connected in parallel, before the accident, to their firing voltage U and U1 from the electrical system N of the vehicle, and are discharged while connected in series, in the case of the accident: and to achieve this, according to the invention, at least two firing capacitors C are each provided in a switching-over manner in the triggering circuits, such as:

in each case the two firing capacitors C1 and C2 according to FIGS. 1 to 3, and to a certain extent in addition the third firing capacitor C3 according to FIGS. 2 and 3 which show two instead of only a single gas generator Z.

The different firing capacitors C are therefore connected in parallel before the accident in such a way that they are all charged to a capacitor voltage corresponding to the voltage U of the electrical system of the vehicle, for example exactly to the value U or just to a reduced value U1, as is seen in FIGS. 1 to 3, in an operating state in which the contacts S shown are not conductive. Then, in fact, the firing capacitors C1 are charged through a series resistor R1 and the firing capacitors C2 are charged through series resistors R2 and R3. The firing capacitors are charged, according to FIGS. 1 and 2, to the voltage U of the electrical system of the vehicle or according to FIG. 3 to a limited voltage U1, respectively, and the firing capacitors C3 are charged through series resistors R4 and R3 to the voltage U according to FIG. 2 or to the voltage U1 according to FIG. 3, respectively. Before the accident, the firing capacitors C which are connected to one another in parallel in relation to the electrical system N of the vehicle are all charged in each case to the voltage U of the electrical system of the vehicle which is kept constant or is variable. In other words, for example, it can be varied to +8 V or +12 V or +15 V or to a voltage U of the electrical system of the vehicle which is kept constant or to a possibly upwardly limited voltage U1.

However, in the case of an accident these firing capacitors C are in each case connected in series in a low-impedance manner in such a way that at least at the start of firing the respective instantaneous total voltage V through this series connection is greater than the different individual instantaneous capacitor voltages in themselves. This switching over of the firing capacitors C which converts their parallel connection into a series connection takes place according to the invention by means of at least a single contact S having a switching state which corresponds to the respectively measured decelerations or accelerations, in other words to say to the sensor values of the crash sensors A, as is seen in FIGS. 1 to 3, in an operating state in which all of the contacts of the crash sensors A, such as S in all three figures and T2, T5 and T6 in FIG. 3, are conductive. Then, in fact:

the gas generator Z1 is fired in a low-impedance manner through the following series connection: the contact S2—the earth-firing capacitor C1—the contact S1—the firing capacitor C2, according to FIGS. 1 and 2, the gas generator Z1 is fired in a low-impedance manner through the following series connection: the contact T2—the earth-firing capacitor C1—the contact S1—the firing capacitor C2—the contact T5, according to FIG. 3, the gas generator Z2 is fired in a low-impedance manner through the following series connection: the contact S2, the earth- firing capacitor C1—the contact S1—the firing capacitor C3, according to FIG. 2, and the gas generator Z2 is fired in a low-impedance manner through the following series connection: the contact T2—the earth-firing capacitor C1—the contact S1—the firing capacitor C3—the contact T6, according to FIG. 3.

Accordingly, in all three illustrated examples according to the invention, in each case two or more firing capacitors C which are initially still connected in parallel are charged before the accident with the voltage U or U1 of the electrical system of the vehicle. In the case of the accident, the firing capacitors C which were previously connected in parallel are connected in series, as a result of which a total voltage V through the series connection of the firing capacitors C is utilized to fire the gas generators Z, such as total voltages V1, V12 and V13 in FIGS. 1 to 3. At the start of firing this total voltage V is in each case a corresponding multiple of the voltage U or U1 of the electrical system of the vehicle. The total voltage V decreases in the course of the subsequent firing phases, i.e. the instantaneous value of V then decreases, with the internal resistance of the gas generators Z then also usually decreasing abruptly. The instantaneous voltages V1 and V2 through the gas generators Z may in a particular case each also be reduced to a greater or lesser extent towards V12 and V13 in these later phases of firing, as is seen in FIGS. 2 and 3, if in fact certain residual resistances such as, for example, T5 and T6 in FIG. 3, remain active in the low-impedance series connection.

Even if only two firing capacitors C which can be switched over in the manner according to the invention are provided, as is seen in FIG. 1, the total voltage V1 at the start of firing is already double the voltage of the electrical system of the vehicle. However, initially more than two firing capacitors which are connected in parallel can also be charged with the voltage U and U1 of the electrical system of the vehicle in order to fire a single gas generator Z with the series connection of, for example, three or four firing capacitors C, as a result of which, when required, the total voltage through the series connection can be correspondingly strongly further increased at the start of firing. Even if the voltage of the electrical system of the vehicle were to be occasionally very low, virtually any desired total voltage can be obtained at the start of firing by means of the series of measures, according to the invention, for amplifying the firing voltage.

Therefore, the invention permits adequately high firing energy to be ensured:

at the start of firing and in every later phase of firing, and with adequately high firing voltage by means of the switching over from parallel connection to series connection, even if the voltage of the electrical system of the vehicle has, for whatever reasons, extremely low values before firing and at the start of firing. Nevertheless, it is possible, but indeed not absolutely necessary, for the voltage U of the voltage source B of the electrical system N of the vehicle to have strong tolerances in the invention, and specifically in particular in the example shown in FIG. 3 but in principle also in the examples shown in FIGS. 1 and 2, that is to say, for example to fluctuate readily between +8 V and +15 V, for example as a consequence of a battery B which is charged to a different degree or because a dynamo B supplies a vehicle electrical system voltage U which is only imprecisely controlled. The series of measures according to the invention actually only then permits very high firing voltages V and V2 to be achieved if the voltage U is very small.

Since it is possible in addition to make the capacitance of the firing capacitors C that are controlled according to the invention as high as desired in principle, it is furthermore possible with the triggering circuits according to the invention to reliably charge the firing capacitors sufficiently before the accident in order to reliably trigger the firing even if the individual firing capacitor C in itself stores an insufficient amount of firing energy and does so with a capacitor voltage U or U1 which is in itself insufficiently high, because of an undervoltage U in the electrical system of the vehicle lasting for a relatively long period of time, for example because only +8 V instead of +12 V have been present for a long time.

Figure 4:
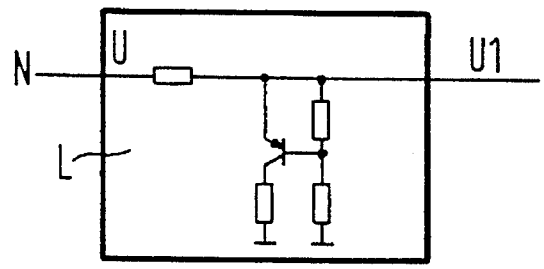
FIG. 4 is a schematic circuit diagram an example of the construction of the overvoltage protection device.

A unit L which is shown in FIG. 3 limits or reduces the voltage U of the electrical system of the vehicle to the value U1. An example of this is shown in FIG. 4. This unit L in particular protects the firing capacitors C connected downstream against voltages which may occur in the electrical system N of the vehicle. As a result, correspondingly lower requirements can be made of the dielectric strength of the firing capacitors C and the service life of these firing capacitors C can be increased. The triggering circuits shown in the figures are therefore distinguished, inter alia, by the fact that the firing capacitors C are charged according to FIGS. 1 and 2 to the voltage U of the electrical system of the vehicle and according to FIG. 3 to the limited or reduced voltage U1.

The person skilled in the art is per se familiar with the fact that electronic switches or contacts can be made overvoltage-proof by means of shorting diodes.

In order to be able to feed the firing energy stored in the firing capacitors C to the respective gas generator Z with a high degree of efficiency in the case of an accident, these firing capacitors can be disconnected (at the latest) at the start of firing in a more or less high-impedance manner, that is to say completely, from the electrical system N of the vehicle. This can be achieved, for example, by the firing capacitors being charged before the accident in each case through relatively high-impedance resistors, such as the resistors R1 to R4 shown in the figures and/or through diodes, such as D1 to D3 shown in the figures. These diodes D are disposed with such a polarity that, if they are involved in the charging of the firing capacitors C, they have low impedance for the charging of the firing capacitors C and high impedance for the firing current of the capacitor occurring in the case of an accident, at any rate as long as the respective instantaneous firing capacitor voltage is greater than the instantaneous voltage U or U1 of the electrical system of the vehicle. In this way it is possible to avoid the capacitor firing current being discharged through the vehicle electrical system lines N in the direction of the battery B instead of largely through the gas generator Z if the electrical system of the vehicle is then per se still intact, or to avoid the firing energy being senselessly wasted because of a short circuit occurring in the electrical system of the vehicle as a result of the accident.

In order to increase the reliability of the triggering circuit further, it is possible to feed the firing energy to the gas generator Z with a particularly high total voltage V at the start of firing but with a decreasing total voltage V to draw the rest of the firing energy from the electrical system N of the vehicle provided the electrical system of the vehicle is still then adequately intact. The rest of the firing energy is also supplied from the firing capacitors C which are then still connected in series only in an emergency, that is to say only if the electrical system of the vehicle is not capable of supplying energy. For this purpose, a parallel connection such as S3 D2 D3 in FIGS. 2 and 3 can be provided in the triggering circuit for the series connection of the firing capacitors C, which is formed in the case of an accident. In the case of an accident, this parallel connection S3 D2 D3 is intended to connect the voltage source B of the electrical system N of the vehicle to the gas generator Z. The parallel connection S3 D2 D3 contains a contact such as S3 which closes in the case of an accident, and one or more diodes D2 D3 with such a polarity that in the case of an accident a firing current of the electrical system of the vehicle is additionally conducted out of the voltage source B of the electrical system N of the vehicle through the gas generator Z with a residual voltage V which occurs through the gas generator Z, for at least as long as the electrical system N of the vehicle is intact and at least as long as the residual voltage V which can be fed to the gas generator Z from the electrical system N of the vehicle is greater than the instantaneous total voltage V of the firing capacitors C which fire this gas generator Z and are connected in series.

According to the invention, in order to be able to make the increased firing voltage available as a total voltage V at the start of firing by using a particularly small number of firing capacitors C even if a plurality of gas generators Z are to be fired successively, that is to say, for example, if a plurality of air bags are to be successively inflated and/or if both air bags and seat belt retractors and possibly also gas-driven roll-over bars are to be successively activated, more firing capacitors C than gas generators Z can be provided. Examples of this are shown in FIGS. 2 and 3. The firing capacitor C2 is permanently assigned in each case to the gas generator Z1, and the firing capacitor C3 is similarly assigned to the gas generator Z2. However, the further firing capacitor C1 is assigned to both gas generators Z. In the case of an accident, the series connection of the firing capacitors C which supplies a gas generator Z with firing energy then in each case contains one firing capacitor C which is permanently assigned to the respective gas generator Z, and the further firing capacitor C. Formulated in a more general way, more firing capacitors C than gas generators Z can therefore be provided to reduce the number of firing capacitors C. However, each firing capacitor C is permanently assigned to a gas generator Z, although the further firing capacitor C or the further firing capacitors C are assigned to a plurality of gas generators Z so that in the case of an accident the series connection of the firing capacitors C, which supplies one gas generator Z with firing energy, in each case contains one firing capacitor C which is permanently assigned to the respective gas generator Z, and one further firing capacitor C.

In addition, in order to be able to fire the individual gas generators Z individually at different times, each permanently assigned firing capacitor C can be assigned its own firing switch S through which the firing can take place individually at the time determined individually for this gas generator Z by the electronic evaluation system P.

In a manner which is known per se, in order to improve the reliability of the triggering circuit, two different kinds of shocks to a vehicle can be easily distinguished in a particularly simple manner, namely those which correspond to a genuine crash situation and are therefore intended to trigger the firing of the gas generator, and those which only correspond to an unevenness of the roadway, that is to say, for example, a pot hole or a branch which has been traveled over, and which are therefore not yet intended to trigger the firing of the gas generator. For this purpose, at least one of the crash sensors A can be a safing sensor A, that is to say an adequately sensitive sensor A having (analog or digital) output signals (exclusively or additionally) which also permit those decelerations or accelerations to be detected which still lie below that threshold above which the gas generator Z is fired. By virtue of the fact that two types of sensors with different characteristics are used, the reliability of the accident being detected as such is increased. Preferably, at least one crash sensor, such as A1, supplies analog output signals for this purpose, which output signals are converted by means of the electronic evaluation device P formed by the microprocessor P into one or more ON/OFF signals that control one or more contacts S and T.

In order to be able to easily test the triggering circuit even years after installation in the vehicle, one or more current sources or voltage sources, such as W in FIG. 3, can be temporarily connected to one or to more of its switching points for test purposes, such as a test switch T7. Additionally, it is seen that for test purposes a test switch T4 connects the firing capacitors C1, C2 in series for safety reasons in a high impedance manner through an additional resistor R5, in such a way that the total voltage or its effects can be measured. There is no risk, because of that high impedance of the series connection, of the gas generator(s) Z being fired.

The triggering circuit can therefore additionally be dimensioned for test purposes in such a way that in the case of the test, currents flowing through the gas generator Z are smaller than would be necessary to fire the gas generator Z and that, at least in the case of the test, measuring points of the triggering circuit are connected to a measuring configuration, such as M1 M2, for example through isolating measuring resistors R6 R7 R8 R9 R10. In this respect see Published International Application WO 91/05680 mentioned above.

In the examples shown, in each case more firing capacitors C and gas generators Z are provided only for the sake of better clarity of the structure according to the invention.

However, in principle the triggering circuit according to the invention can also contain the same number as, or fewer firing capacitors C than, gas generators Z, if in fact the firing energy of the one individual series connection of firing capacitors C is distributed together over a large number of gas generators Z. In principle, in a triggering circuit according to the invention in fact only at least two firing capacitors C have to be provided which are charged in parallel but discharged in series, although in that case, in principle the number of gas generators Z can then be selected as desired. However, in a manner which is known per se, a particularly quickly firing gas generator Z should then be prevented from short circuiting another slower gas generator connected in parallel before the latter gas generator also fires, as is seen, for example, in Published European Application No. 0 284 728 B.

I claim:

1. In a vehicle including an electrical system and a vehicle occupant protective system having at least one gas generator, a triggering circuit for the protective system, comprising:

a plurality of firing capacitors connected to the electrical system and to the at least one gas generator of the vehicle, said firing capacitors being charged before an accident to a capacitor voltage from the electrical system, as an energy source for firing the at least one gas generator; and at least one crash sensor connected to said firing capacitors controlling the protective system by detecting an occurrence of sensor values triggering the firing and having at least one single contact controlling the firing of the at least one gas generator by discharging a respective one of said firing capacitors;

said plurality of firing capacitors being connected in parallel before the accident and then charged to a capacitor voltage corresponding to the voltage of the electrical system, and being switched-over to be connected in series with low-impedance upon the occurrence of the accident, by said at least one single contact, for setting an instantaneous total voltage through said series connection to be greater than individual capacitor voltages, at least at the start of firing; and said at least a single contact feeding the total voltage to the at least one gas generator with low-impedance.

2. The triggering circuit according to claim 1, wherein the protective system for the occupant of the vehicle is an air bag.

3. The triggering circuit according to claim 1, wherein the protective system for the occupant of the vehicle is a seat belt retractor configuration.

4. The triggering circuit according to claim 1, wherein said firing capacitors are an energy source for firing an explosive charge connected thereto.

5. The triggering circuit according to claim 1, wherein said firing capacitors are an energy source for firing a firing cap of an explosive charge connected thereto.

6. The triggering circuit according to claim 1, including a switch connected in the occupant protective system for selectively disconnecting said firing capacitors from the electrical system in a high-impedance manner at the start of firing, directly after the actuation of said at least one contact, for setting the total voltage to be greater than the voltage in the electrical system and for causing currents of said firing capacitors to flow essentially through the at least one gas generator instead of through the electrical system, as a result of the disconnection.

7. The triggering circuit according to claim 6, including at least one high-impedance resistor connected to at least one of said firing capacitors through which the charging of said respective firing capacitors takes place before the accident, said at least one high-impedance resistor forming the high-impedance disconnection of at least part of said firing capacitors from the electrical system.

8. The triggering circuit according to claim 6, including at least one diode connected to at least one of said firing capacitors having low impedance for charging said firing capacitors and high impedance for the capacitor firing current occurring in the case of an accident as long as the respective instantaneous firing capacitor voltage is greater than the instantaneous voltage in the electrical system, said at least one diode forming the high-impedance disconnection.

9. The triggering circuit according to claim 1, including:

a parallel connection for said firing capacitors connecting a voltage source of the electrical system to the at least one gas generator in the case of an accident; and said parallel connection having a contact connected to the electrical system and closing in the case of an accident, and a diode connected to said contact and having a polarity conducting a firing current of the electrical system out of the voltage source of the electrical system through the at least one gas generator with a residual voltage occurring through the at least one gas generator, in the case of an accident, for at least as long as the electrical system is intact and for at least as long as a residual voltage to be fed to the at least one gas generator from the electrical system is greater than the instantaneous total voltage of said firing capacitors connected in series.

10. The triggering circuit according to claim 1, wherein:

more of said firing capacitors than the gas generators are provided; and each of said gas generators having a respective one of said firing capacitors permanently assigned thereto, and at least a further one of said firing capacitor being assigned to a plurality of said gas generators, and in the case of an accident the series connection of said firing capacitors supplying one of said gas generators with firing energy each containing one of said firing capacitors being permanently assigned to said respective gas generator and at least one further firing capacitor.

11. The triggering circuit according to claim 10, including:

firing switches each connected to a respective one of said permanently assigned firing capacitors; and an electronic evaluation connected to at least one of said firing switches for evaluating sensor values and controlling at least one of said firing switches individually for causing the firing of the gas generators connected to said firing switches to take place at different times.

12. The triggering circuit according to claim 1, wherein said at least one crash sensor is a particularly sensitive safing sensor supplying analog or digital output signals, exclusively or additionally, permitting clear detection of decelerations or accelerations lying below a threshold above which the at least one gas generator is fired.

13. The triggering circuit according to claim 12, including an electronic evaluation device formed by a microprocessor connected to said at least one crash sensor for converting analog output signals from said at least one crash sensor into at least one ON/OFF signal controlling at least one contact connected thereto.

14. The triggering circuit according to claim 1, including at least one current source or voltage source being temporarily connected to at least one switching point; and including a measuring configuration; during a test currents flowing through the at least one gas generator being at least smaller than would be necessary to fire the at least one gas generator; and at least during a test measuring points of the triggering circuit being connected to said measuring configuration.

15. The triggering circuit according to claim 14, including a test switch and a further resistor for selectively connecting said firing capacitors in series with high-impedance for test purposes.

* * * * *